2,799,716

METHOD OF PURIFYING TRICHLOROETHYLENE

Berthal D. Brummet, Sparta, N. J., assignor, by mesne assignments, to McGraw-Edison Company, Elgin, Ill., a corporation of Delaware No Drawing. Application February 8, 1954, Serial No. 408,988

7 Claims. (Cl. 260—654)

This invention relates to a novel and economical method of purifying commercial grade trichloroethylene to render the same usable as an anesthetic.

Commercial grade trichloroethylene contains many impurities which render it unsuitable for anesthetic purposes. These impurities, for example, comprise the mono-, di- and trichloroacetyl chlorides, and dissolved gases such as acetylene, mono- or di-chloroacetylene, phosgene and carbon dioxide. In accordance with the present invention, these impurities are removed by a simple process involving the combined extractive and chemical reaction effects of water and a gas at least relatively inert with respect to trichloroethylene. Preferably, nitrogen is used, but air can also be used for practical purposes, it being understood that while trichloroethylene will oxidize slowly in the presence of air, the slowly formed oxidation products are soluble in and reactable with the water to cause these products to be removed as fast as they are formed during the purifying process.

An object of my invention is to provide a practical, efficient and economical method of purifying commercial grade trichloroethylene, and a further and more particular object is to provide such purifying method for converting commercial grade trichloroethylene to a substantially pure state free of elements which have toxic, irritating or other injurious effects on a patient when the trichloroethylene is used as an anesthetic.

In a preferred method of carrying out my invention, commercial grade trichloroethylene is mixed with substantially pure water such as distilled water. However, tap water may be used if it is free of halogens. This liquid mixture is agitated for about twenty-five minutes while nitrogen gas is passed continuously over the surface of the liquid phase. By way of example, the trichloroethylene and water may be agitated in a cold rolled steel reactor equipped with means for agitation and turned at about nine hundred R. P. M., the agitator being provided with inlet and outlet vents through which the nitrogen gas is passed to maintain an inert atmosphere over the turbulent surface of the liquid.

During the agitation step the different impurities are removed in the following ways: (1) the water soluble impurities are dissolved in the water and removed from the organic phase by extraction; (2) other liquid impurities such as the mono-, di- and trichloroacetyl chlorides are hydrolyzed to the corresponding substituted acetic acids and hydrochloric acid and are taken up in the water phase; and (3) other impurities of a gaseous character, which are dissolved in the organic phase and which comprise acetylene, phosgene and carbon dioxide, are removed by action of the nitrogen gas. For instance, during the agitation step, the extractive effect of nitrogen is based on the uptake of nitrogen in a finely dispersed form in the liquid phase, enhanced by the turbulent surface of the liquid. This dispersion of nitrogen acts as a carrier to strip other dissolved gases, such as acetylene, phosgene and carbon dioxide, from the liquid phase. By continuously venting the reactor, the released gaseous impurities are carried off with the excess nitrogen gas leaving the reactor.

Following the agitation step, the liquid phase is allowed to separate for about ten minutes, during which time the trichloroethylene, being heavier than water, settles to the bottom. An inert gas, preferably again nitrogen, is maintained over the liquid surface during this settling operation.

The trichloroethylene is next removed by drawing-off or pumping operations, and is subjected then to a drying action to remove dissolved water. The drying step is preferably carried out by pumping the trichloroethylene through a drying column such as of silica gel. From this column the trichloroethylene is led into a storage tank which previously has been swept clear of gases as with the use of dry nitrogen.

Preferably, a common stabilizer is next added such as of ethyl alcohol. If desirable, any suitable identification dye may also be added. The product is next bottled out of contact with the outside air to assure stability. Preferably, the bottling is carried out under a dry, inert atmosphere such as dry nitrogen.

The method of purifying trichloroethylene herein particularly described is intended to be illustrative and not necessarily limitative of my invention since the same is subject to changes and modifications without departure from the scope of my invention which I endeavor to express according to the following claims.

I claim:

1. A process of purifying commercial grade trichloroethylene to render it suitable as an anesthetic, which comprises agitating the same with water substantially free of halogens, and passing an inert gas over the surface of the mixture of trichloroethylene and water during the agitation.

2. A process of purifying commercial grade trichloroethylene which comprises washing said trichloroethylene with water substantially free of halogen ions and other impurities while agitating the same under an atmosphere of nitrogen gas, separating the trichloroethylene from the water under a nitrogen atmosphere and subjecting the same to drying action to remove dissolved water.

3. A process of purifying commercial grade trichloroethylene which comprises agitating the same with a substantially equal volume of distilled water while passing an inert gas over the turbulent surface of the trichloroethylene-water mixture, and separating said trichloroethylene and drying the same to remove dissolved water.

4. A process of purifying commercial grade trichloroethylene which comprises mixing substantially equal volumes of said trichloroethylene and substantially pure water in a reactor having rotatable agitating means, rotating said agitatable means at about nine hundred R. P. M. for a period of approximately twenty-five minutes, passing nitrogen gas into said reactor over the liquid phase during the agitating operation, and venting said reactor to pass off excess nitrogen gas and gaseous impurities released from said trichloroethylene.

5. A process of purifying commercial grade trichloroethylene which comprises mixing the same with water free of halogens, agitating said mixture while passing nitrogen gas over the liquid surface, separating the trichloroethylene from the water and thereupon drying the trichloroethylene to remove dissolved water therefrom.

6. A process of purifying trichloroethylene containing first impurities of water-soluble character, second impurities of water-reactive character, and third impurities in the form of dissolved gases, which process comprises mixing said impure trichloroethylene with water free of halogens to cause said first impurities to be dissolved in the water phase and said second impurities to react with and be taken up in the water phase, concurrently agitating the trichloroethylene-water mixture, and stripping the dissolved gases therefrom by flowing a continuous supply of inert gas thereover.

7. A process of purifying trichloroethylene containing water-soluble impurities and/or water-reactive chlorides and containing dissolved gaseous impurities comprising mono- and dichloroacetylene, phosgene, acetylene and/or carbon dioxide, which comprises mixing water free of halogens with said tricholorethylene to cause said water-soluble impurities and chlorides to be taken up in the water phase, concurrently agitating the trichloroethylene-water mixture while flowing a continual supply of nitrogen gas over the turbulent surface thereof to cause said dissolved gases to be stripped from the trichloroethylene-water mixture, and thereafter separating the trichloroethylene from the water phase.

References Cited in the file of this patent

UNITED STATES PATENTS

| | | |
|---|---|---|
| 2,000,881 | Coleman | May 7, 1935 |
| 2,252,536 | Wiley | Aug. 12, 1941 |
| 2,402,425 | Meier | June 18, 1946 |
| 2,456,184 | Greenwald | Dec. 14, 1948 |
| 2,463,601 | Crawford et al. | Mar. 8, 1949 |

FOREIGN PATENTS

| | | |
|---|---|---|
| 637,526 | Germany | Oct. 30, 1936 |